United States Patent [19]

Rice et al.

[11] Patent Number: 5,480,121

[45] Date of Patent: Jan. 2, 1996

[54] BREAK-AWAY CONNCETOR FOR SIGN POST

[75] Inventors: Gerald Rice; Walter A. Alexander, Sr., both of Marietta, Ga.

[73] Assignee: VSAR Systems of Atlanta, Inc., Marietta, Ga.

[21] Appl. No.: 147,119

[22] Filed: Nov. 3, 1993

[51] Int. Cl.⁶ .................................................. F16M 13/00
[52] U.S. Cl. ............................ 248/548; 52/98; 248/900; 403/2; 404/10
[58] Field of Search ...................... 248/900, 548; 403/2; 52/98, 155; 404/10, 11

[56] References Cited

U.S. PATENT DOCUMENTS

| | | |
|---|---|---|
| 903,944 | 11/1908 | Andersen . |
| 911,504 | 2/1909 | Jay . |
| 3,381,427 | 5/1968 | Watson .................................. 52/98 |
| 3,628,296 | 12/1971 | Henry ..................................... 52/98 |
| 3,969,853 | 7/1976 | Deike .................................... 52/156 |
| 4,021,977 | 5/1977 | Deike ..................................... 52/98 |
| 4,280,768 | 7/1981 | Pardue, Jr. et al. ..................... 403/3 |
| 4,389,034 | 6/1983 | Suttles .................................. 248/49 |
| 4,490,062 | 12/1984 | Chisholm ................................ 403/2 |
| 4,492,493 | 1/1985 | Webb ................................... 405/172 |
| 4,593,872 | 6/1986 | Svensson ............................. 248/156 |
| 4,615,156 | 10/1986 | Deike .................................. 404/11 X |
| 4,653,245 | 3/1987 | Webb ................................... 52/749 |
| 4,803,812 | 2/1989 | Alexander, Sr. ....................... 52/157 |
| 4,850,565 | 7/1989 | Moreno ............................. 248/548 X |
| 4,928,446 | 5/1990 | Alexander, Sr. ........................ 52/98 |
| 5,004,366 | 4/1991 | Simmons ............................ 404/10 X |
| 5,125,194 | 6/1992 | Granger ............................... 403/2 X |
| 5,214,886 | 6/1993 | Hugron ............................ 248/900 X |

OTHER PUBLICATIONS

Franklin Steel eze-erect sign posts Installation.

Primary Examiner—J. Franklin Foss
Attorney, Agent, or Firm—Kennedy & Kennedy

[57] ABSTRACT

A break-way connector for a sign post having a stud rigidly welded to two spaced-apart channel members, with a central portion of the stud between the channel members having a groove and a pair of radial bores centered on the groove to define an area for shearing upon sudden impact, the break-away connector joining together an in-ground post and an above-ground post for holding a sign.

20 Claims, 1 Drawing Sheet

U.S. Patent                    Jan. 2, 1996                    5,480,121
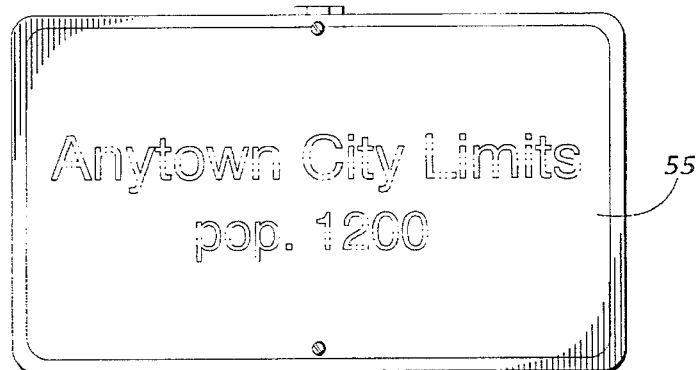
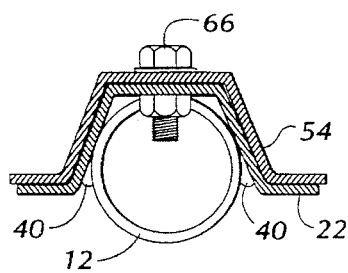
FIG. 3
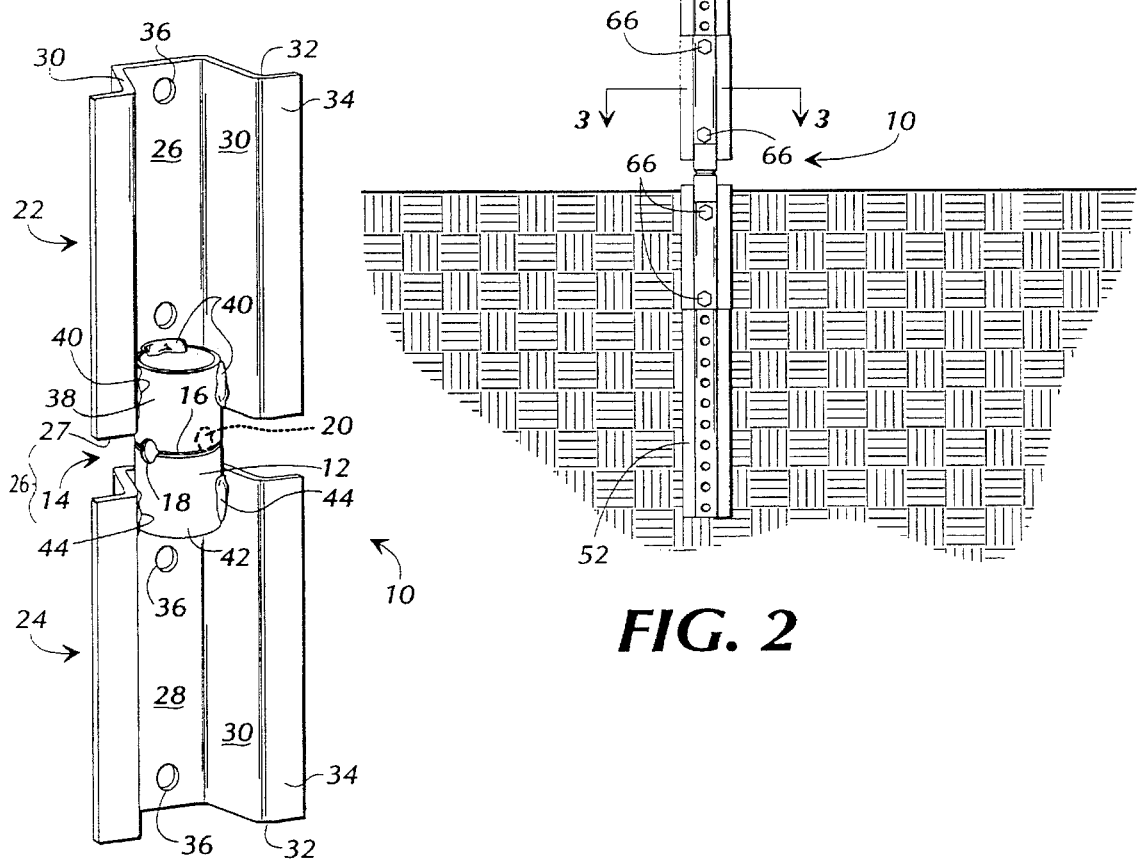
FIG. 1
FIG. 2

5,480,121

BREAK-AWAY CONNCETOR FOR SIGN POST

TECHNICAL FIELD

The present invention relates to highway sign posts. More particularly, the present invention relates to a break-away connector for a sign post, which connector severs near ground level upon impact of the sign post by a motor vehicle.

BACKGROUND

Sign posts are frequently encountered articles on the right-of-way of roads and highways. The sign posts are placed off of the road on the shoulder area of the right-of-way. The signs attached to the posts carry routing and travel information for motorists, including mileage, route designations, fuel and rest stop information, as well as other signage.

The posts typically are embedded in the ground with a above-ground portion to which the sign attaches. Various anchors have been designed for holding the post securely in the ground. Secure anchoring is necessary, as the signs must withstand the force of wind. A wind transverse to the face of the sign does not impose a significant load on the anchoring of the post. However, wind blowing on the face of the sign, even at an acute angle, imposes a significant load.

In addition to the requirement that highway signs be capable of withstanding high wind force, it is also preferable that the posts detach from the anchor upon sudden high impact, such as during a collision by a motor vehicle. By detaching from the anchor, the above-ground portion of the post and the sign are thrown by the impact away from vehicle. This significantly reduces the potential for damage to the vehicle and opportunity for injury to passengers. Further, separation of the in-ground post and the above-ground post during impact reduces damage to the in-ground post, thereby facilitating re-use of the in-ground post for re-mounting the detached sign.

Break-away sign posts have heretofore been devised for use in holding signs yet detaching during sudden impact. U.S. Pat. No. 4,928,446 describes a break-away post that comprises two elongated channels of a U-shape construction connected together by a cylindrical stud. The stud has a central portion with a groove in the surface that defines a reduced wall thickness. This provides an area of structural weakness. The stud includes four pairs of transversely aligned holes through the wall of the stud. The cylindrical stud is held in the U-shaped channel. Bolts pass through the channels and the stud. Nuts thread on the bolts to securely fasten the channels and the stud together.

During sudden impact by a motor vehicle, the area of weakness shears. The post separates, allowing the sign and the above-ground portion of the post to be thrown away from the vehicle. In an impact other than head-on, however, the channel tends to twist about the longitudinal axis of the post. The force of the impact transfers to the bolts securing the stud to the channels. The bolts have a length of 2 and ½ inches. For bolts having a shear strength that exceeds the shear strength of the weakened portion of the stud, the stud shears as with a direct head-on impact. The twisting force causes weaker bolts however to shear before the stud shears. As a consequence, the post may then fail to separate. Instead, the post is shattered between the ground level and the point of impact or is bent downwardly and under the vehicle. Either one increases the potential for damage to the vehicle and injury to passengers. While higher-strength bolts can be used, these are significantly more expensive and highway maintenance programs would incur increased inventory tracking and monitoring costs.

Accordingly, there is a need in the art for an improved break-away sign post that severs near ground level upon sudden impact by a motor vehicle, regardless of the direction from which the impact is applied.

SUMMARY OF THE INVENTION

The present invention meets the need for an improved break-away sign post that severs at ground level upon impact by a motor vehicle, and in a preferred embodiment, regardless of the direction from which the impact is applied. Generally described, the present invention provides a stud integrally connected to a pair of channels that bolt to a ground post and a sign post. The stud includes a central area of reduced wall thickness defined by a groove, for shearing upon sudden impact of the sign post. In a preferred embodiment for shearing upon sudden indirect impact, the stud includes at least one bore and preferably a pair of aligned radial bores centered on the groove.

More particularly described, the present invention provides a severable assembly that connects a ground post and a sign post. The assembly comprises two elongated channels of generally U-shaped construction which are spaced apart and integrally connected to a stud. The stud has a tubular wall of a selected thickness. The stud is sized to be received in the open space defined by the channel and to abut the inside surfaces of the channel. A central portion of the stud has a groove which makes a tubular wall thickness less than the selected thickness. The groove provides an area of structural weakness for allowing the stud to shear. The stud integrally connects at an upper portion to one channel and at a lower portion to the other channel with the central portion in a gap between the two channels. The channels are then wedgingly fit within the U-shaped ground and sign posts. Short bolts connect the posts to the respective channels.

More particularly described, for omnidirectional shear, the stud has two aligned radial bores through the tubular wall in the central portion. The bores are centered on the groove and define a line that is substantially parallel to the web of the U-shaped channels. The stud is preferably connected to the channels by welding.

Features and advantages of the present invention will become apparent from a reading of the following specification, in conjunction with the drawings and appended claims.

BRIEF DESCRIPTION OF THE DRAWINGS

FIG. 1 is a perspective view of break-away connector of the present invention.

FIG. 2 is a front view of a highway sign post that includes the break-away connector illustrated in FIG. 1.

FIG. 3 is a plan view of the break-away connector secured to the highway sign post, taken along line 3—3 in FIG. 2.

DETAILED DESCRIPTION

Referring now in more detail to the drawings, in which like numerals indicate like parts throughout the several views, FIG. 1 illustrates a perspective view of a break-away connector 10 of the present invention. The connector 10 comprises an assembly of a stud 12 having a selected wall thickness and two spaced apart channels 22 and 24. In the illustrated embodiment, the stud 12 is a cylinder. The stud 12 includes a central portion generally designated 14 having a wall thickness less than the selected wall thickness of the stud. A groove 16 is cut in the surface of the wall to define the thinner wall thickness in the central portion 14. The stud 12 includes a pair of aligned radial bores 18 and 20 in the central portion 14. The bores 18 and 20 are preferably centered on the groove 16.

The stud 12 integrally connects to the two elongated channels 22 and 24. The channels 22 and 24 are disposed in spaced-apart relation with the central portion 14 in a gap 26 between the two channels defined by longitudinal edges 27. The channels 22 and 24 each include a web 28 with a pair of side walls 30 divergently extending outwardly from the web. Each side wall has a distal end 32. In the illustrated embodiment, a flange 34 extends laterally outward from each of the distal ends 32. The flanges 34 preferably are in a plane parallel to the web 28. The channels 22 and 24 accordingly define members having substantially a U-shape in cross-sectional view. Each channel 22 and 24 includes a pair of holes 36 for receiving bolts. The bolts extend through the holes 36 to secure the break-away connector 10 to a sign post, as discussed below.

The stud 12 integrally connects to the two channels 22 and 24. An upper portion 38 of the stud 12 welds at 40 to the channel 22. A lower portion 42 of the stud 12 welds at 44 to the channel 24. The stud 12 is sized such that it may be placed in three-point contact with the web 28 and the side walls 30 of the channels 22 and 24. The stud 12 is welded at 40 and 42 at the points of contact with the channel for rigidly connecting the stud to the channels. The stud 12 is positioned on the channels so that the bores 18 and 20 define a line substantially parallel to the web 28 of the channels 22 and 24. The bores 18 and 20 cooperate with the groove 16 to define the weakened central area 14 for shearing. In an alternated embodiment (not illustrated), the groove 16 is cut deeper in the stud in the portions of the central area 14 that are positioned near the flanges 34. In an alternate embodiment, one bore is formed in the groove 16. This embodiment requires the hole be on the side of the post receiving the indirect impact because it is preferable that the bore be in tension stress during sudden impact for cooperating with the groove to shear.

FIG. 2 illustrates a highway sign 50 that uses the break-away connector 10. The break-away connector 10 bolts to an in-ground member 52 and an above-ground member 54. A plate-like sign 55 bolts to an upper end of the above-ground member 54. Each member 52 and 54 is of a conventional generally U-shaped open flange channel construction. Specifically, the members 52 and 54 are made of steel and have a flat web 56 from which two side walls divergently extend. A flange 60 extends laterally outward from a distal end of each side wall. The flanges 60 are coplanar and are parallel to the plane of the web 56. A spaced-apart series of holes 64 are formed in the web 56. Typically the holes 64 are one-inch apart. The in-ground member 52 is typically about three feet in length, but the length can be varied depending on the soil type. An anchor (not illustrated) can be attached to a lower portion of the in-ground member 52 for securing the member in the ground. The above-ground member 54 is typically about ten feet long. The web 56 and extending side walls define an open receiving space.

The in-ground member 52 and the above-ground member 54 are connected together by the break-away connector 10. Nuts and bolts 66 are used to secure the connector 10 to the members 52 and 54, as best illustrated in FIG. 3, a plan view of the break-away connector 10 connected to the highway sign post 54, taken along line 3—3 in FIG. 2. The channels 22 and 24 are configured as discussed above for fitting within the interior space defined by the members 52 and 54. The U-shaped channels 22 and 24 wedgingly insert into the respective open space defined by the web and side walls of the members 52 and 54. The channels 22 and 24 are sized for closely fitting into the members 52 and 54. The channels 22 and 24 should not spread the members 52 and 54. A spacer (not illustrated) may be inserted between the channel and the member to prevent the members from spreading. Bolts 66 then extend through the holes 64 in the web 56 of the members 52 and 54 and through the holes 36 in the web 28 of the connector 10. Nuts threadingly engage the bolts to tightly secure the members 52 and 52 to the connector 10. Such assembly is preferably done after the in-ground member 52 has been driven into the ground, as with a sledge hammer, to a depth sufficient to provide a sturdy anchoring for the sign in the type of soil encountered. Although not illustrated, the in-ground member 52 can include an anchor, such as a screw-auger end or flanges that extend outwardly to engage the soil.

During sudden impact on the above-ground member 54, such as accidental striking by a vehicle, the stress and twisting forces transfer from the above-ground member to the break-away connector 10. The stress is directly transferred to the stud through the welded channel 22 that rigidly connects to the closely-fitted member 54. The moment of the short bolts 66 is sufficiently low that the stress applies at the groove 16. The break-away connector 10 shears at the groove 16 in the central portion 14. As a result, the above-ground member 54 and the sign 55 break away from the in-ground member 52. Typically the member 54 and the sign 55 are thrown a distance from the point of impact. This serves to limit the damaging force of the sign post 54 on the vehicle and reduce the risk of injury to passengers in the vehicle. The lower portion of the stud 12 remains engaged to the in-ground member 52. This portion however is close to ground level, and thereby poses little if any risk for damaging the undercarriage of the vehicle.

The displaced member 54 and sign 55 are readily re-installed with a new break-away connector 10. It may be necessary to excavate around the upper portion of the in-ground member 52 to expose the nuts and bolts 66 that secure the severed connector 10 to the member. The groove 16 is preferably no higher than 4 inches above ground level when the assembled posts 10, 52 and 54 are installed. The severed connector 10 is removed and a new break-away post connected to the in-ground member 52. The above-ground member 54 is then bolted to the connector 10 with the nuts and bolts 66. It is preferred that the bolts pass through the second or third hole 64 from the respective longitudinal end of the posts 52 and 54.

In a preferred embodiment, the stud 12 is 4 inches long with 1.5 inch outer diameter and a 0.156 inch wall thickness. The stud 12 is preferably a ASTM A513 type 5 tube. The groove 16 is preferable a V-shape cut (with sides at 45 degrees to horizontal) with a depth of 0.035 inches. The bores 0.18 and 20 are each $\frac{3}{8}$ inches in diameter through the wall of the stud 12. The radial bores 18 and 20 are transversely aligned and are centered in the groove 16.

The channels 22 and 24 in a preferred embodiment are each 8 gauge steel (ASTM A569-B) that are 8 inches long. The web 28 is 1 inch wide and the side walls 30 extend divergently outward at a 29 degree angle (14.5 degrees from vertical for each side wall 30.) The holes 36 are oval shaped having dimensions of $\frac{11}{32}$ by $\frac{7}{16}$ inches. The holes are centered 5 inches apart with a first hole centered 2.25 inches from the longitudinal edge 27 of the channel.

The stud 12 is positioned on the channel with a ½ inch gap between the groove 16 and the longitudinal edge 27 of the channel. This provides a 1 inch gap between the aligned channels 22 and 24. The stud 12 nests inside the U-shaped channel with three-point contact for welding. The stud 12 is positioned in the channels 22 and 24 with the bores 18 and 20 preferably aligned coplanar with the flanges 34 of the channels 22 and 24.

It is thus seen that a break-away connector of simple and economic construction is provided which may be readily connected to posts for highway sign use. The short-bolt connection between the posts 52, 54 and the channels 22, 24 that integrally connect to the stud 12 transfers the twisting force from a non-direct impact on the sign post 54 to the groove 16 in the stud. The bore 18, 20 in the groove 16 facilitates the stud 12 shearing on the groove for severing the connector 10 of the sign post at ground level upon omnidirectional sudden impact.

The principles, preferred embodiments, and modes of operation of the present invention have been described in the foregoing specification. The invention is not to be construed as limited to the particular forms disclosed because these are regarded as illustrative rather than restrictive. Moreover, it should be understood that variations and changes may be made by those skilled in the art without departing from the spirit and scope of the invention as described by the following claims.

What is claimed is:

1. A break-away connector for connecting to an in-ground post and na above-ground post of a highway sign, comprising:

two elongated channels of generally U-shaped construction in cross-sectional view; and a stud having a tubular wall of a selected thickness with an outside surface sized to abut the inside surfaces of the channels with a central portion of the stud having a tubular wall thickness less than the selected thickness to provide an area of structural weakness for allowing the stud to fracture omnidirectionally, the stud welded at an upper portion to one channel and at a lower portion to the other channel to form an integral connector for wedging attachment to an in-ground_post and an above-ground post of a highway sign with bolts extending through spaced-apart bores in each of the channels with the central portion between the two channels, whereby the connector, being bolted to the in-ground post and the above-ground post of the highway sign, severs at the central portion upon impact of the highway sign by a motor vehicle regardless of the direction from which the impact is applied.

2. The break-away connector as recited in claim 1, wherein the wall thickness less than the selected thickness is defined by groove in the stud.

3. The break-away connector as recited in claim 1, further comprising at least one bore extending through the tubular wall and centered on the central portion.

4. The break-away connector as recited in claim 1, wherein the stud has two aligned radial bores through the tubular wall, each of the bores positioned next to a distal edge of a respective side wall of the channels.

5. The break-away connector as recited in claim 4, wherein the wall thickness less than the selected thickness is defined by a groove in the stud.

6. The break-away connector as recited in claim 5, wherein the bores are centered on the groove.

7. The break-away connector as recited in claim 1, wherein the stud is welded to the channels.

8. The break-away connector as recited in claim 1, wherein the stud is cylindrical.

9. The break-away connector as recited in claim 1, wherein the elongated channels having a flat web from which two side walls divergently extend outwardly with spaced-apart distal ends; and further comprising:

a groove in the central portion that defines the wall thickness less than the selected thickness; and a pair of aligned radial bores centered on the groove, the stud positioned on the channels with the bores next to a respective side wall of the channels.

10. A highway sign post having a break-away connector, for supporting a highway sign and severing upon impact by a motor vehicle, comprising:

two elongated channels that each define an interior receiving space, the channels of generally U-shaped construction in cross-sectional view;

a stud having a selected wall thickness and a central portion defining a wall thickness less than the selected wall thickness to provide an area of structural weakness for severing omnidirectionally, the stud rigidly welded in an upper portion and a lower portion to the channels which are aligned in mutually spaced relation with the central portion located between the channels;

an in-ground post of generally U-shaped construction in cross-sectional view connected to one of the channels with a pair of bolts extending through bores in the channel which is wedgingly received by the post; and an above-ground post of generally U-shaped construction in cross-sectional view connected to the other of the channels with a pair of bolts extending through bores in channel which is wedgingly received by the post, whereby a force of a sudden impact by a motor vehicle to the above-ground post, being transferred to the central portion, shears the stud.

11. The highway sign post as recited in claim 10, wherein the wall thickness less than the selected thickness is defined by a groove in the stud.

12. The highway sign post as recited in claim 11, further comprising at least one bore extending through the tubular wall and centered on the groove.

13. The highway sign post as recited in claim 11, wherein the stud has two aligned radial bores through the tubular wall, each of the bores positioned next to a distal edge of a respective side wall of the channels.

14. The highway sign post as recited in claim 13, wherein the bores are centered on the groove.

15. The highway sign post as recited in claim 10, wherein the stud is welded to the channels.

16. The highway sign post as recited in claim 10, wherein the stud is cylindrical.

17. The highway sign post as recited in claim 10, wherein the elongated channels are of generally U-shaped construction having a flat web from which two side walls divergently extend outwardly with spaced-apart distal ends.

18. The highway sign post as recited in claim 13, wherein each of the bores are positioned next to a respective one of the distal ends of the side walls of the channel.

19. A method of connecting an above-ground member for a sign to an in-ground member for separating during sudden impact on the above-ground member, comprising:

scoring a groove in a central portion of a stud having a selected thickness to define a central portion having a wall thickness less than the selected thickness;

welding an upper portion of the stud to a first channel and a lower portion to a second channel;

rigidly bolting the first channel to an above-ground member for carrying a sign and the second channel to an in-ground member, whereby the force of an impact on the above-ground member, being transferred to the groove, shears the stud.

20. The method as recited in claim 19, further comprising the steps:

boring at least one hole in the stud centered on the groove; and positioning the stud with the hole between adjacent edges of the spaced-apart channels.

* * * * *